Nov. 3, 1925.　　　　　　　　　　　　　　　　　　1,560,243
B. KACZOROWSKI
WATERPROOF CONTAINER FOR PERSONAL ACCESSORIES
Filed Nov. 13, 1924

INVENTOR
Bernard Kaczorowski
BY
ATTORNEY

Patented Nov. 3, 1925.

1,560,243

UNITED STATES PATENT OFFICE.

BERNARD KACZOROWSKI, OF YONKERS, NEW YORK.

WATERPROOF CONTAINER FOR PERSONAL ACCESSORIES.

Application filed November 13, 1924. Serial No. 749,576.

*To all whom it may concern:*

Be it known that I, BERNARD KACZOROWSKI, a citizen of the United States, residing at Yonkers, in the county of Westchester and State of New York, have invented certain new and useful Improvements in Waterproof Containers for Personal Accessories, of which the following is a specification.

This invention relates generally to boxes or containers for small personal accessories, such as are commonly carried by women, the invention having for an object the provision of a novel container of this sort which is arranged for containing different articles, and which may be adjusted at the desire of the owner to conveniently carry articles of one sort or of a different sort.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved container.

Figure 1:
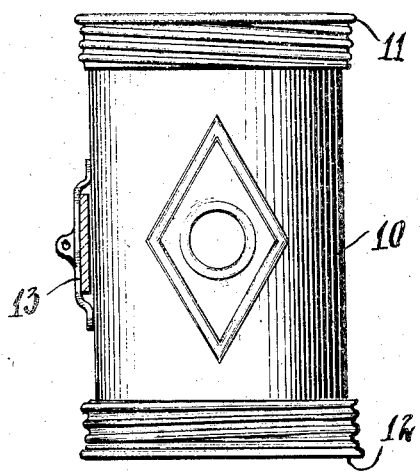
Figure 2:
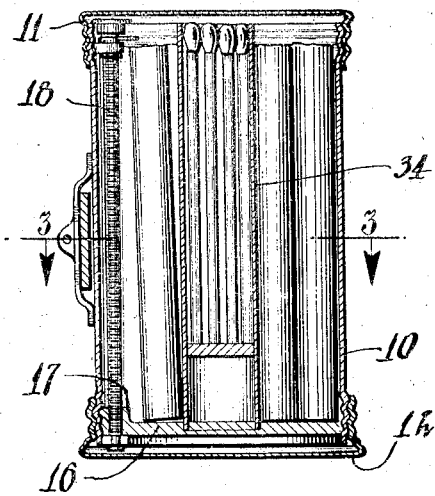
Fig. 2 is a central longitudinal sectional view thereof.
Figure 3:
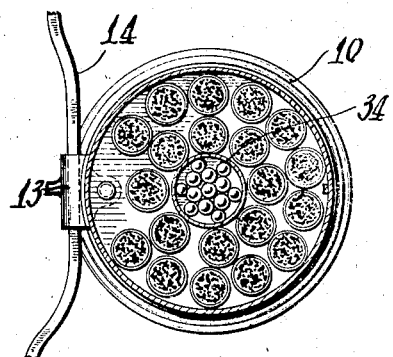
Fig. 3 is a transverse sectional view taken on the line 3—3 of Fig. 2.

My improved device comprises a cylindrical casing 10 which is preferably of a length slightly greater than the length of an ordinary cigarette. This casing has screw-threaded ends on which are screwed the closing caps 11 and 12 respectively. The casing is provided with a handle 13 through which a band or ribbon 14 may be looped for convenience in carrying the casing. Located in this casing, to be adjustable to different positions longitudinally of the casing, is a partition member 16 in the form of a disk that in certain cases, functions as a follower. This disk 16 is formed at one side with an apertured boss 17 through which extends a screw 18 that is located adjacent one side of the casing, the screw being of substantially equal length with the casing and having a threaded engagement with the boss 17 whereby rotation of the screw causes the disk 16 to be moved longitudinally in the casing.

Fixed to the side wall of the casing, adjacent one end thereof, is a block 20 that has an aperture extending longitudinally therethrough in which is located a bushing or sleeve 21 that is free to rotate in said block. This sleeve is formed at its outer end with a laterally projecting finger 22 whose hub element 22′ engages over the outer end of the block 20 while at its inner end the sleeve is formed with a laterally projecting stud 23 that normally engages over the inner end of the said block, but which may be brought into registry with a longitudinal slot 24 in the said block that is entered into the latter from its inner end. The end of the screw 18 projects beyond the sleeve 21 and is formed with an enlarged head 26 for rotation purposes. This head 26 acts in conjunction with a collar 27 fixed to the screw adjacent the inner end of the sleeve, to prevent relative longitudinal movement of the sleeve and screw. Adjacent its outer end the bore of the block 20 is formed with an enlargement 30 in which is positioned an expansion spring 31 that is coiled around the sleeve and that bears outwardly on the hub 22′ of the finger 22. As will be apparent, when the finger 22 is swung to move the stud 23 into registry with the slot 24 the sleeve 21, screw 18, and follower disk 16 will be projected outward in the casing until the stud 23 reaches the end of the slot 24.

The disk 16 is preferably formed on one side with an annular groove 33 that receives one end of a tube 34 positioned in the casing centrally thereof, when the disk is at that end of the casing removed from the block 20. This tube serves as a receptacle for matches, while the annular space in the casing around said tube serves as a receptacle for cigarettes.

Figure 4:
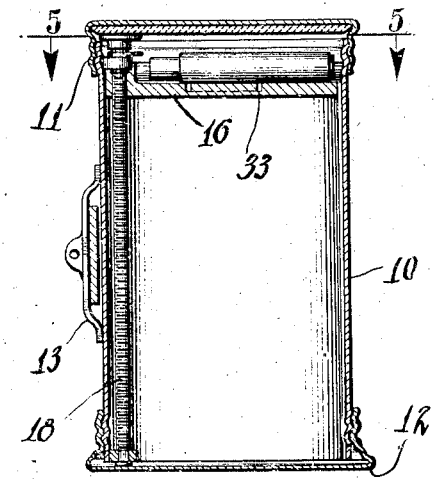
Fig. 4 is a similar view to Fig. 2 but showing the interior partition differently positioned.
Figure 5:
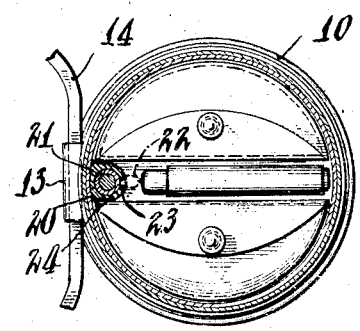
Fig. 5 is an end view of the device arranged as in Fig. 4, the cover being removed.
Figure 6:
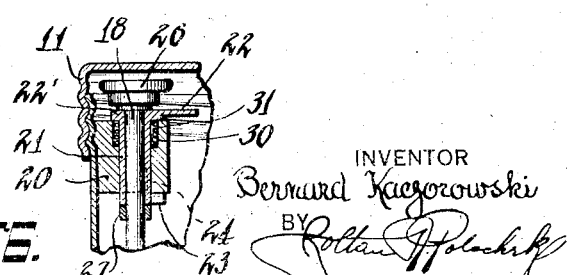
Fig. 6 is a fragmentary vertical sectional view showing in detail the means for moving the follower outward.

If it is not desired to carry cigarettes in the device the tube 34 may be removed and the disk adjusted to the position shown in Fig. 4 of the drawing adjacent the block 20, leaving just sufficient space between the said disk and the cap to receive a rouge stick, or small purses or like articles.

Having thus described my invention, what I claim as new and desire to protect by Letters Patent of the United States is as follows:

1. A device of the class described comprising a casing arranged to present separate cigarette and match compartments, a follower in said casing having an annular groove in one face thereof, a tube in said casing engaging at one end in said groove to constitute a match receptacle, and means for moving said follower longitudinally in the said casing to position it near either end of said casing.

2. A device of the class described comprising a casing, an apertured block fixed to said casing adjacent one end of the latter, a sleeve mounted in said block for free rotation and having a laterally projecting finger at its outer end, a screw passing freely through said sleeve, a follower engaged with said screw to be moved along the casing by rotation of the said screw, and a stud on the inner end of said sleeve projecting over the inner end of said block to retain the said sleeve and screw against longitudinal movement, said block having a longitudinal notch entered thereinto from the inner end thereof to permit of longitudinal movement of the said sleeve in the block upon partial rotation of the sleeve to bring the said stud into registry with the said notch.

3. A device of the class described comprising a casing, an apertured block fixed to said casing adjacent one end of the latter, a sleeve mounted in said block for free rotation and having a laterally projecting finger at its outer end, a screw passing freely through said sleeve, a follower engaged with said screw to be moved along the casing by rotation of the said screw, and a stud on the inner end of said sleeve projecting over the inner end of said block to retain the said sleeve and screw against longitudinal movement, said block having a longitudinal notch entered thereinto from the inner end thereof to permit of longitudinal movement of the said sleeve in the block upon partial rotation of the sleeve to bring the said stud into registry with the said notch, and a spring engaged with said sleeve and urging the same longitudinally outward.

In testimony whereof I have affixed my signature.

BERNARD KACZOROWSKI.